(12) United States Patent
Osmanis et al.

(10) Patent No.: US 10,495,894 B2
(45) Date of Patent: Dec. 3, 2019

(54) OPTICAL DISPLAY ARRANGEMENT AND METHOD OF OPERATION

(71) Applicant: Lightspace Technologies, SIA, Marupes novads (LV)

(72) Inventors: Ilmārs Osmanis, Mārupes novads (LV); Ainārs Ozols, Siguldas novads (LV); Kriss Osmanis, Babītes novads (LV); Roberts Zabels, Riga (LV)

(73) Assignee: LIGHTSPACE TECHNOLOGIES, SIA, Marupe, Marupes Novads (LV)

( * ) Notice: Subject to any disclaimer, the term of this patent is extended or adjusted under 35 U.S.C. 154(b) by 44 days.

(21) Appl. No.: 15/812,838

(22) Filed: Nov. 14, 2017

(65) Prior Publication Data
US 2019/0146232 A1   May 16, 2019

(51) Int. Cl.
| | |
|---|---|
| G02B 27/22 | (2018.01) |
| G02F 1/133 | (2006.01) |
| G02F 1/137 | (2006.01) |
| H04N 13/395 | (2018.01) |
| H04N 13/363 | (2018.01) |
| G03B 35/18 | (2006.01) |

(52) U.S. Cl.
CPC ..... *G02B 27/2278* (2013.01); *G02F 1/13318* (2013.01); *G02F 1/13718* (2013.01); *H04N 13/363* (2018.05); *H04N 13/395* (2018.05); *G02F 2001/13775* (2013.01); *G03B 35/18* (2013.01)

(58) Field of Classification Search
CPC . G02B 27/2278; G03B 35/18; G02F 1/13318; G02F 1/13718; G02F 2001/13775; H04N 13/395; H04N 13/363
See application file for complete search history.

(56) References Cited

U.S. PATENT DOCUMENTS

| | | | | |
|---|---|---|---|---|
| 8,083,385 B1* | 12/2011 | Yang | ... | G02F 1/13318 349/13 |
| 2002/0113753 A1* | 8/2002 | Sullivan | ... | G02B 27/225 345/6 |
| 2002/0163482 A1* | 11/2002 | Sullivan | ... | G02B 27/2278 345/6 |
| 2006/0092117 A1 | 5/2006 | Kubota et al. | | |

OTHER PUBLICATIONS

International Search Report and Written Opinion received for International Application No. PCT/IB2018/056962, dated Nov. 23, 2018, 14 pages.

* cited by examiner

*Primary Examiner* — Brent D Castiaux
(74) *Attorney, Agent, or Firm* — Ziegler IP Law Group, LLC

(57) ABSTRACT

There is disclosed an optical display arrangement. The optical display arrangement includes an optical element, a voltage source connected to the optical element and a controller operatively coupled to the voltage source. The controller is operable to control the voltage source to apply a first voltage pulse over an operating voltage for a first period of time, to the optical element, to switch the optical element from a first optical state to a second optical state wherein the first voltage pulse is a sum of elevated voltage and operating voltage. Furthermore, the controller is operable to provide the operating voltage to the optical element to maintain the optical element in the second optical state. Moreover, the controller is operable to remove the operating voltage from the optical element to switch the optical element from the second optical state to the first optical state.

20 Claims, 8 Drawing Sheets

| Active Substance | Temperature (°C) | Voltage (V) |
|---|---|---|
| A | 20 | 130 |
| | 35 | 120 |
| | 50 | 120 |
| B | 20 | 130 |
| | 35 | 120 |
| | 50 | 120 |
| C | 20 | 130 |
| | 35 | 120 |
| | 50 | 120 |

FIG. 4A

| Active Substance | Temperature (°C) | Transmittance (%) |
|---|---|---|
| A | 20 | 4 |
| | 35 | 6 |
| | 50 | 10 |
| B | 20 | 2 |
| | 35 | 4 |
| | 50 | 7 |
| C | 20 | 3 |
| | 35 | 4 |
| | 50 | 6 |

FIG. 4B

OPTICAL DISPLAY ARRANGEMENT AND METHOD OF OPERATION

TECHNICAL FIELD

The present disclosure relates generally to optical display arrangements; and more specifically, to liquid crystal-based optical display arrangements.

BACKGROUND

Traditionally, digital content including images, videos, documents, and so forth, has been presented and consumed in 2-dimensional (or 2D) format. However, with advancement of technology, there has been a shift from such practice towards using 3-dimensional (or 3D) content for the same purposes. For example, content that was meant for entertainment, to provide information and suchlike was typically viewed on display systems including computer monitors, televisions, portable displays and so forth. Furthermore, such display systems were only capable of displaying 2D content. In the past few years, however, people have increasingly adopted display systems capable of presenting 3D content, such as virtual reality headsets, 3D cinema screens and so forth, for viewing 3D content. Furthermore, such 3D display systems are also finding application in areas such as medicine, education, science, defence and so forth.

Conventionally, 3D display systems enable 3D content to be presented to a user by using techniques such as stereoscopy. Such 3D display systems present a slightly altered view of the 3D content to each eye of the user, thereby, enabling the user to perceive 3-dimensional nature or depth associated with the presented content. Furthermore, use of such conventional 3D display systems to view the presented content necessitates use of headsets, glasses and suchlike. Such a practice of using headsets, glasses and so forth to view the 3D content is generally uncomfortable, cumbersome and inconveniences the user.

Usually, such problems associated with conventional 3D display systems are overcome by use of volumetric display devices. The volumetric display device comprises multiple screens and a portion of a 3D image is displayed on each of the multiple screens. In general, the volumetric display devices reproduce an image in a physical space, thus enabling all physical depth cues as if the user is viewing a real object. In one of the approaches, the volumetric display device comprises multiple screens and a portion of a 3D image is displayed on each of the multiple screens. Furthermore, the multiple screens are sequentially activated. The presentation of the portions of the 3D image on the sequentially activated multiple screens, enables a user of the volumetric display device to perceive a depth associated with the 3D image. It will be appreciated that such volumetric display devices enable display of 3D images without a use of headsets, glasses and so forth, and is capable of displaying images to users positioned both near and farther away from the devices.

Generally, known volumetric displays require fast display components. One of the problems is need for higher resolution. In volumetric displays resolution (in depth direction) is achieved by stacking multiple layers of display components in top of each other. If the transparency is low the display images which are positioned farthest from a viewer might not be adequately visible. In addition, the display layers close to a viewer might not receive sufficient amount of light from a projector. In order to project information in a display element of the volumetric display the display element must have sufficient light diffusion characteristics. Moreover, some of the volumetric display devices can have a low frame rate. It is well known that the human eye is able to perceive motion (such as motion represented in the 3D videos) at a minimum frame rate of 20 frames-per-second. Also, to present a 3D video on a volumetric display device comprising 20 display screens, the screens are required to be switched on and off with fast response time. As more layers are added the faster the response time to turn, the display used to project an image, on and off must be. If that is not possible, decreased frame rates cannot be met, thereby, decreasing a perceived quality of the displayed 3D videos for the users. Moreover, since the number of the display screens of volumetric display is high the associated operating lifetime and reliability of each of the display elements must be higher than in conventional liquid crystal displays. Low operating lifetime increases probability that at least one of the display element malfunctions thus reducing overall useful lifetime of the device, thus, increasing operating costs associated with use of such devices.

Therefore, in light of the foregoing discussion, there exists a need to overcome the aforementioned drawbacks associated with volumetric display devices.

SUMMARY

The present disclosure seeks to provide an optical display arrangement. The present disclosure also seeks to provide a method of operating an optical display arrangement. The present disclosure seeks to provide a solution to the existing problem of low switching rates between different optical states of display screens. An aim of the present disclosure is to provide a solution that overcomes at least partially the problems encountered in prior art, and provides an optical display arrangement that is operable to provide fast switching between different optical states of optical elements.

In one aspect, an embodiment of the present disclosure provides an optical display arrangement comprising:
  an optical element;
  a voltage source connected to the optical element; and
  a controller operatively coupled to the voltage source, wherein the controller is operable to control the voltage source to:
  apply a first voltage pulse for at least a first period of time, to the optical element, to switch the optical element from a first optical state to a second optical state, wherein a value of the first voltage pulse is at least a sum of an elevated voltage and an operating voltage;
  provide the operating voltage to the optical element to maintain the optical element in the second optical state; and
  lowering the operating voltage applied to the optical element to switch the optical element from the second optical state to the first optical state.

In another aspect, an embodiment of the present disclosure provides a method of operating an optical display arrangement comprising an optical element, a voltage source and a controller operable to control the voltage source, wherein the method comprises:
  applying a first voltage pulse at least a first period of time, to the optical element, for switching the optical element from a first optical state to a second optical state, wherein a value of the first voltage pulse is at least a sum of an elevated voltage and an operating voltage;
  providing the operating voltage to the optical element for maintaining the optical element in the second optical state; and lowering the operating voltage applied to the optical element for switching the optical element from the second optical state to the first optical state.

Embodiments of the present disclosure substantially eliminate or at least partially address the aforementioned problems in the prior art, and enable fast switching of the optical element between optical states and safe operation of the optical display arrangement.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 4A is a table illustrating voltages applied to an optical element (such as the optical element of FIG. 1) for attaining a relative transmittance between 95 to 100%, for different temperatures and different active substances, in accordance with an embodiment of the present disclosure;

FIG. 4B is a table illustrating a change in relative transmittance with respect to temperature of an optical element (such as the optical element of FIG. 1) in an optically opaque state, when a voltage of 110 volts is applied across the optical element, in accordance with an embodiment of the present disclosure;

Figure 1A:
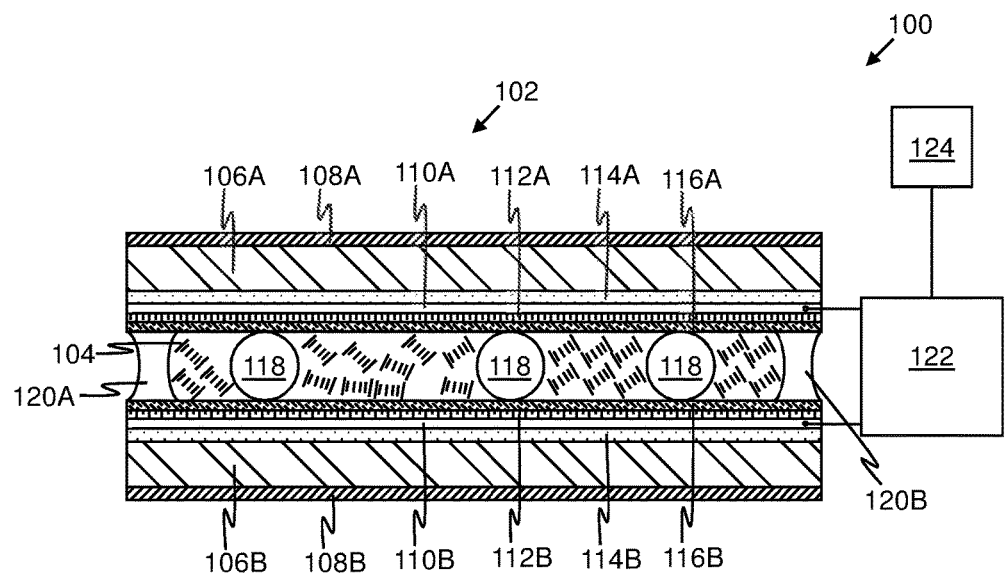
FIGS. 1A-B are schematic illustrations of an optical display arrangement, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an optical display arrangement comprising:

an optical element;

a voltage source connected to the optical element; and a controller operatively coupled to the voltage source, wherein the controller is operable to control the voltage source to:
    apply a first voltage pulse, for at least a first period of time, to the optical element, to switch the optical element from a first optical state to a second optical state, wherein a value of the first voltage pulse is at least a sum of an elevated voltage and an operating voltage;
    provide the operating voltage to the optical element to maintain the optical element in the second optical state; and
    lower the operating voltage applied to the optical element to switch the optical element from the second optical state to the first optical state.

In another aspect, an embodiment of the present disclosure provides a method of operating an optical display arrangement comprising an optical element, a voltage source and a controller operable to control the voltage source, wherein the method comprises:
    applying a first voltage pulse for at least a first period of time, to the optical element, for switching the optical element from a first optical state to a second optical state, wherein a value of the first voltage pulse is at least a sum of an elevated voltage and an operating voltage;
    providing the operating voltage to the optical element for maintaining the optical element in the second optical state; and
    lowering the operating voltage applied to the optical element for switching the optical element from the second optical state to the first optical state.

The present disclosure provides the optical display arrangement comprising the optical element, the voltage source connected to the optical element, and the controller operatively coupled to the voltage source. The controller is operable to control the voltage source to apply the first voltage pulse, to switch the optical element from the first optical state (such as an optically opaque state) to the second optical state (such as an optically transparent state), wherein the first voltage pulse value is a sum of the elevated voltage and the operating voltage. Such an application of the first voltage pulse (which value is elevated voltage added to the operating voltage) enables to reduce a rise time associated with switching of the optical element from the first optical state to the second optical state. The reduction in rise time provides fast switching speeds (such as less than one millisecond) for switching between the first and second optical states of the optical elements, thereby enabling to provide increased frame rates during operation of the optical display arrangement (such as a volumetric refresh rate equal to or more than 25 hertz for example 50 Hz). As an example, if we have a 20 layer volumetric display stack, display elements must be capable of switching from a transparent state to an opaque state with refresh rate of 25 Hz then each element can be in an opaque state in given example for maximum of 2 milliseconds at the time. I.e. display element is transparent for 38 milliseconds and is opaque for 2 milliseconds. It will be appreciated that providing such increased frame rates enables to provide high quality 3D images and videos. For example, the 3D images presented on the optical display arrangements will be perceptually devoid of flickering and smooth motion can be represented in 3D videos presented on the optical display arrangements. Furthermore, providing such high-quality 3D images and videos enables a comfortable viewing experience for a user of the optical display arrangements. Moreover, the fast switching speeds enable to switch the optical element to the optically opaque state at a faster rate as compared to conventional 3D display devices, thus, enabling to provide increased number of layers of the optical elements, thus improving 3D resolution in "depth" direction with use of multiple optical elements and so forth. Moreover, as the first voltage pulse is applied for a short period of time, a possibility of dielectric breakdown of the active substance due to prolonged application of high strength electric fields is reduced. Also, as the optical elements may have an electric field applied thereto for a majority of operating life of the optical display arrangement, electric field-induced stresses on the optical elements are reduced. Therefore, the operating life of the optical element and the optical display arrangement is increased.

The term "optical display arrangement" as used throughout the present disclosure, relates to display devices that are capable of presenting one or more images (or videos) thereon. Examples of such display devices include televisions, computer monitors, portable device displays and so forth. In one example, the optical display arrangement is a multi-planar display device that is capable of presenting 3-dimensional (or 3D) images or videos thereon. Such an optical display arrangement comprises a plurality of planar display elements (such as screens) that are operable to be sequentially enabled to display a portion (or slice) of a 3D image (or video) thereon. Furthermore, when various portions of the 3D image are sequentially displayed on the plurality of planar display elements at a fast cycling rate (or refresh rate), a user perceives a 3-dimensional nature (or depth) associated with the 3D image.

The optical display arrangement comprises an optical element. The term "optical element" as used throughout the present disclosure, relates to a display element associated with the optical display arrangement. According to an embodiment the optical element is a liquid crystal-based display element that is operable to be electrically switched between at least two different optical states. Such an optical element comprises an active substance including an optically active blend of liquid crystals. Furthermore, a texture of the active substance is operable to be modified by application of a voltage across the optical element, to switch the optical state of the optical element between the at least two optical states.

In one embodiment, the active substance is Liquid Crystals (LC). Furthermore, the active substance is namely cholesteric liquid crystal, wherein the chiral nematic phase is associated with a director of liquid crystal molecules of each layer having a rotational orientation around an axis of helix. In one example, the LC's are a mixture of low-viscosity nematic liquid crystal host and a chiral dopant. Such a mixture of the low-viscosity liquid crystals and the chiral dopant is associated with a homeotropic alignment of liquid crystal molecules when a voltage is applied across the optical element. Furthermore, the homeotropic alignment results in the optical element having an optically transparent state. The homeotropic alignment stays as long as a voltage is applied. Moreover, when the applied voltage is removed from the optical element, the homeotropic alignment of the liquid crystal molecules is erased and liquid crystal molecules temporarily attain a transient-planar alignment. Corresponding to such transient-planar alignment of the liquid crystal molecules, the optical element temporarily attains a partially optically opaque state (or an optically semi-transparent state). Such a partially optically opaque state of the optical element is associated with transmittance of around 50% of incident light through the optical element. Subsequently, the alignment of the liquid crystal molecules becomes different from the transient-planar configuration and the active substance is identified by a focal-conic texture, wherein the optical element is operable to attain an optically opaque (or light-diffusive) state. Such an optically opaque state of the optical element enables projection of one or more images thereon.

In an embodiment, the active substance is implemented using Polymer Dispersed Liquid Crystals (PDLCs). In another embodiment, the active substance is implemented using Polymer Stabilised Cholesteric Liquid Crystals (PSCLCs). Such an active substance that is implemented using PSCLCs is associated with a homeotropic alignment of the liquid crystal molecules when a voltage is applied across the optical element and no alignment of the liquid crystal molecules when the applied voltage is removed from the optical element.

According to an embodiment, the active substance is enclosed between optically transparent dielectric substrates. The optically transparent dielectric substrates act as walls that enable retention of the active substance therebetween. It will be appreciated that for such retention of the active substance, at least one optically transparent dielectric substrate is arranged on one side of the active substance (such as on a front side of the active substance) and at least one optically transparent dielectric substrate is arranged on an opposite side of the active substance (such as on a rear side of the active substance). In one example, the optically transparent dielectric substrates are implemented as rigid or flexible optically transparent sheets that are fabricated using plastics. In another example, the optically transparent dielectric substrates are implemented as rigid optically transparent sheets of glass, poly(methyl methacrylate) or suchlike. In yet another example, the optically transparent dielectric substrates are implemented as flexible optically transparent polymer films, such as optically transparent polycarbonate films.

In an embodiment, an outer surface of the optically transparent dielectric substrates is coated with an anti-reflective coating (or ARC). The outer surface of the optically transparent dielectric substrates is an opposite surface with respect to a surface facing towards the active substance. The anti-reflective coating on the optically transparent dielectric substrates reduces unwanted reflections of incident light therefrom, and increases transmittance of light through the optical element. Such an increase in transmittance of light through the optical element improves a presentation quality (such as a clarity or image resolution associated with presented images) of the optical display arrangement. In an example, the anti-reflective coating is implemented as a single layer of $SiO_2$ or as laminated layers of $SiO_2$—$TiO_2$. Furthermore, the anti-reflective coating is applied on the optically transparent dielectric substrates using a technique such as, physical vapour deposition (for example, by reactive evaporation of $Ti_2O_3$).

In one embodiment, the optical element further comprises electrically conductive layers arranged between each of the optically transparent dielectric substrates and the active substance. For example, an electrically conductive layer is included on each side of the active substance, wherein the electrically conductive layer is sandwiched between the optically transparent dielectric substrate and the active substance. Furthermore, the electrically conductive layers are implemented as transparent electrodes that are operable to apply a uniform electric field across the optical element when a voltage is applied thereto. In one example, the electrically conductive layers are fabricated using electrically-conducting optically transparent materials, including but not limited to, indium tin oxide (ITO), silver nanowire meshes, doped zinc oxide, grapheme, carbon nanotubes and/or conductive polymers.

The optical display arrangement comprises a voltage source connected to the optical element. The voltage source is a controllable voltage source that is electrically connected to the electrically conductive layers of the optical element. The voltage source is operable to apply voltage to the electrically conductive layers, to enable an electric field to be applied across the optical element. In one example, the optical display arrangement comprises a plurality of optical elements and each optical element of the optical display arrangement is individually connected to separate voltage sources. Furthermore, the voltage source is operable to be controlled to provide a variable voltage (such as different voltages at different period of time) to the electrically conductive layers.

According to an embodiment, the optical element further comprises an electrically insulating layer arranged on each side of the active substance between the electrically conductive layers and the active substance. For example, the voltage source enables to increase strength of the electric field applied across the optical element, such as, by increasing the voltage applied to the electrically conductive layers. However, such an increase in the strength of the applied electric field may lead to dielectric breakdown of the active substance, thus, leading to failure of the optical element (and consequently, malfunctioning or failure of the optical display arrangement). The electrically insulating layers enable to reduce a possibility of failure of the optical element by providing resistance to such dielectric breakdown of the active substance. In one example, the electrically insulating layers are fabricated using optically transparent materials having high dielectric strength, including but not limited to, $SiO_2$, refractory nitrides, refractory oxides, or suchlike. In another example, the electrically insulating layers are implemented having thickness in a range of 120 to 150 nanometres.

In one embodiment, the optical element further comprises a buffer layer arranged on each side of the active substance, wherein the buffer layer is included between the optically transparent dielectric substrate and the electrically conductive layer. The buffer layer prevents transmission of impurities between the optically transparent dielectric substrate and the electrically conductive layer. In one example, the buffer layer is fabricated using an optically transparent material, such as $SiO_2$. The buffer layer can also be selected to match refractive indices of the glass substrate and ITO layer.

According to one embodiment, the optical element further comprises a liquid crystal alignment layer arranged along each side of the active substance. The liquid crystal alignment layers enable to improve a response of the liquid crystal molecules of the active substance, in response to application and/or removal of the electric field across the optical element. In such an instance, the liquid crystal alignment layers enable appropriate orientation of directors of liquid crystal molecules of each layer of the active substance. In one example, the liquid crystal alignment layers have thickness in a range of 90 to 110 nanometres and are fabricated using polyimide or other surfactants promoting homeotropic alignment. Moreover, the liquid crystal alignment layers act as additional electrically insulating layers, thereby, enabling to further prevent dielectric breakdown of the active substance (and failure of the optical element).

In one embodiment, a plurality of electrically insulating spacers is arranged within the optical element. For example, the electrically insulating spacers are arranged to maintain a predefined separation between the optically transparent dielectric substrates. Furthermore, the electrically insulating spacers are arranged in a space defined between the layers proximal to the active substance, such as, between the liquid crystal alignment layers. In such an instance, a thickness of the electrically insulating spacers defines a separation between the optically transparent dielectric substrates and consequently, a thickness of the active substance enclosed therebetween. Moreover, the electrically insulating spacers are fabricated using optically transparent materials. Such electrically insulating spacers enable to maintain the predefined separation between the optically transparent dielectric substrates, while enabling transmittance of incident light through the optical element. In one example, the electrically insulating spacers are implemented as spheres, having diameter in a range of 7 to 15 micrometres, more optionally, in a range of 10 to 12 micrometres. Furthermore, the electrically insulating spacers implemented as the spheres are incorporated into the optical element using a layer of adhesive. The adhesive layer can be applied to the spheres before constructing the optical element. In another example, the electrically insulating spacers are produced using a photoresist film, which could be an epoxy-based photoresist such as SU-8 or similar. The process includes coating one of the dielectric substrates (with all functional layers) with a layer of chosen photoresist, thickness of which corresponds to a desirable cell gap. After subsequent technological procedures, that might include prebake, the photoresist film is illuminated by UV light using a patterned mask or alternatively a computer controlled UV laser stage could be employed to illuminate a desired pattern. After illumination, the technological process might require post-illumination bake after which the process of development can be carried out revealing the final 3D structure of spacer elements—in form of square or round studs, for example.

According to one embodiment, the optical element further comprises seals that enable retention of the active substance between the optically transparent dielectric substrates. For example, the optical element comprises seals implemented as a gasket, wherein the gasket is arranged along a periphery of the inside surfaces of the optically transparent dielectric substrates. In one example, the seals are fabricated using for example epoxy resins and deposited on the inside surfaces of the optically transparent dielectric substrates using a printing technique. The implementation of the gasket using the epoxy resins and/or the deposition of the seals using printing techniques may reduce a dielectric strength of the seals, for example, due to inclusion of air bubbles within the gasket during printing thereof. Furthermore, such reduction in dielectric strength may lead to dielectric breakdown of the seals when the electric field is applied across the optical element. In addition the seal typically has a lower electric break down voltage than used liquid crystal material. This might lead to a situation where driving voltage of optical element is limited by characteristics of the seal and not the liquid crystal material. In an example, each of the electrically conductive layers includes an isolation gap. Such an isolation gap prevents the electric field from being applied across the seal, thereby, enabling to prevent dielectric breakdown thereof. In one example, a width and position of the isolation gap depends to a thickness and position of the seal in the optical element. In another example, when the active substance has a thickness of 12 micrometres, the isolation gap is associated with the thickness is in a range of 50-120 micrometres most preferably 80 to 100 micrometers. The width of the isolation gap is a function of thickness of the active substance (in practice size of cell-gap spacers). As an example, the isolation gap should to be at least 3 times wider than the cell gap (12×3=36 microns). When dimensioning the gap an anisotropy of liquid crystal dielectric constant has to be taken into account. In present example dielectric constant of liquid crystal is approximately 3 times lower in one direction than in other direction. In general, to select width of the cell gap, difference between dielectric constant in different directions is taken in consideration.

The optical display arrangement comprises a controller operatively coupled to the voltage source. The controller is implemented as a data processing arrangement that is operable to store and process instructions to control of the voltage source. Furthermore, the controller is operatively coupled to the voltage source using wired or wireless connection to provide instructions to the voltage source. In one example, the controller and the voltage source are implemented as part of a unitary component, such as an optical element driver.

It will be appreciated that the optical element will be associated with an optical state with no voltage (or electric field resulting from said application of voltage) is applied across the optical element. Such an optical state is the first optical state of the optical element and is associated with a first alignment of liquid crystal molecules and a first texture of the active substance. Furthermore, the controller is operable to control the voltage source to apply an operating voltage to the optical element. The optical element, in response to the applied operating voltage, switches from the first optical state to a second optical state. In one embodiment, the operating voltage is more than a threshold voltage. More over the optical element is maintained in the first optical state when the applied voltage is close to 0 volts, for example 0 to 5 volts. As the applied voltage is increased the optical element starts to switch from the first optical state to the other. Furthermore, when the applied voltage crosses the threshold voltage the optical element switches from the first optical state to the second optical state. Such a threshold voltage is predefined for each optical element, and is based on various factors, including but not limited to, a composition of the active substance, an operating temperature of the optical element, thickness of the active layer and so forth. The second optical state is associated with a change in the alignment of the liquid crystal molecules from the first alignment to a second alignment and a modification of the texture of the active substance from the first texture to a second texture. In an embodiment, the threshold voltage corresponds to an electric field strength of 7.5-10 megavolts per metre. For example, when the separation between the optically transparent dielectric substrates (comprising the active substance) is 12 micrometres, the threshold voltage is 90-120 volts. Depending on the active substance the threshold voltage can be also for example 110-140 volts.

In an embodiment the first optical state is optically opaque state and the second optical state is the optically transparent state.

Moreover, a period of time required for the optical element to switch from the first state to the second state (or "rise time", as referred to hereinafter) is dependent on various factors, such as a magnitude of the applied voltage, operating temperature of the optical element, composition of the active substance and so forth. For example, the rise time of the optical element decreases with an increase in magnitude of the voltage applied across the optical element.

The controller is operable to control the voltage source to apply a first voltage pulse (of sum of elevated voltage and an operating voltage) for a first period of time, to the optical element, to switch the optical element from a first optical state to a second optical state. The first voltage pulse is more than the threshold voltage of the optical element and the application of the first pulse enables realignment of the liquid crystal molecules of the active substance from the first alignment to the second alignment. Consequently, the optical state of the optical element is switched from the first optical state to the second optical state. In one example, the operating voltage is associated with voltage V and the elevated voltage is associated with voltage $V_0$. The first voltage pulse is associated with application of voltage $V_{total}$, wherein $V_{total}$ is a sum of the operating voltage V and the elevated voltage $V_0$. Furthermore, $V_{total}$ is more than the threshold voltage of the optical element. According to an embodiment, the elevated voltage corresponds to an electric field strength of more than 4 megavolts per metre. For example, when the separation between the optically transparent dielectric substrates (comprising the active substance) is 12 micrometres, the elevated voltage is 41 volts. In such an example, when the threshold voltage is 120 volts, the first voltage pulse is associated with a voltage of 161 volts. In correlation between the electric field strength and voltage is determined by distance between the transparent dielectric substrates. E=V/d wherein E is electric field strength, V is voltage and d is distance between the dielectric substrates. In present disclosure example voltage values such as the first voltage pulse value, the operating voltage, the elevated voltage and the threshold voltages are example voltages which, when applied to certain geometry (defined by distance between the dielectric substances) will result to an electric field strength value. As an example if distance is doubled same electric field value can be obtained by doubling the voltage.

In an embodiment, the first voltage pulse value (i.e. sum of the operating voltage and the elevated voltage) is less than a breakdown voltage of the optical element. The breakdown voltage of the optical element depends on multiple factors, including but not limited to, the separation gap between the optically transparent dielectric substrates comprising the active substance, a purity of the active substance (such as, presence of impurities therein), operating temperature of the optical element and so forth. Such application of the first voltage pulse being less than the breakdown voltage of the optical element enables to prevent dielectric breakdown of the active substance, thereby, enabling safe operation of the optical element (and the optical display arrangement).

According to one embodiment (and based on measurements carried out with a display element), the breakdown voltage is equal to an electric filed strength of more than 25 megavolts per metre. For example, when the separation between the optically transparent dielectric substrates (comprising the active substance) is 12 micrometres, the breakdown voltage is equal to or more than 250 volts. In such an example, the applied first voltage pulse is less than 250 volts.

Furthermore, the first voltage pulse is applied for the first period of time and results in the optical element switching from the first optical state to the second optical state. As mentioned hereinabove, the rise time of the optical element decreases with an increase in magnitude of the applied voltage across the optical element. However, such increase in magnitude of the applied voltage for an extended period of time may lead to dielectric breakdown of the active substance and thereby, cause premature failure of the optical element. Therefore, the controller is operable to control the voltage source to apply a short duration first voltage pulse associated with the first period of time. Such a short first voltage pulse enables to switch the optical state of the optical element without the active substance experiencing dielectric breakdown (due to application of voltage for an extended period of time). Furthermore, the application of the short first voltage pulse enables faster realignment of liquid crystal molecules of the active substance from the first alignment to the second alignment. Also, the application of the short voltage pulse enables faster charging of the electrically conductive layers, thereby decreasing the rise time of the optical element. Such decrease in rise time enables to provide fast switching of the optical element from the first optical state to the second optical state. In one embodiment, the first period of time is in a range of 0.1 to 0.60 milliseconds. For example, when the first voltage pulse is applied for a period of time between 0.1 to 0.60 milliseconds, the optical element is operable to switch from the first optical state to the second optical state in less than one millisecond. Alternatively the period of time can be between 0.45 to 0.6 milliseconds. Alternatively the period of time can can be between 0.1-5 milliseconds or 0.1-3 milliseconds or 0.1-1 milliseconds or 0.1-0.6 milliseconds.

It will be appreciated that the controller can control the voltage source to apply pulses of different first voltage pulse values for different periods of time to the optical element, to enable a corresponding reduction in the rise time thereof. For example, a first voltage pulse of 200 volts is applied to the optical element for the first period of time of 0.5 milliseconds, wherein the optical element is associated with an operating voltage of 150 volts (elevated voltage 50 volts). Such application of the elevated voltage applied over the operating voltage value (i.e. the first voltage pulse value) enables reduction of the rise time of the optical element in a range of 35 to 45% (for example, reduction of 38%).

The controller is operable to control the voltage source to provide the operating voltage to the optical element to maintain the optical element in the second optical state. For example, the optical element is required to be switched from the first optical state to the second optical state to enable the optical element to stay transparent while information is rendered to another optical element in a stack of optical elements (basically the information is rendered to an optical element which is at a first optical stage i.e. no voltage applied to the element). The controller is operable to control the voltage source to apply the first voltage pulse to the optical element (as explained hereinbefore), to enable such switching to the second optical state. Furthermore, upon switching of the optical element to the second optical state, the optical element is required to be maintained in the second optical state for a predetermined period of time, such as to enable the element to be transparent thereon for the predetermined period of time. In such an instance, subsequent to switching of the optical element from the first optical state to the second optical state using the first voltage pulse, the controller is operable to control the voltage source to provide the operating voltage to the optical element, to maintain the optical element in the second optical state.

The controller is operable to control the voltage source to lower the operating voltage applied to the optical element to switch the optical element from the second optical state to the first optical state. For example, in operation of the optical display arrangement, subsequent to transparent state, the optical element is required to be returned from the second optical state to the first optical state to render information in the optical element (such as for presentation of one or more images on the optical element). Optionally, the optical display arrangement is required to be returned to a non-operating state (such as, to enable a user to "turn off" the optical display arrangement). In such an instance, the controller is operable to control the voltage source to remove (or lower) the applied operating voltage therefrom. Such removal (or lowering) of the applied operating voltage enables realignment of the liquid crystal molecules from the second alignment back to the first alignment thereof. Furthermore, such realignment enables the optical element to be returned to the first optical state.

In an embodiment, the controller is operable to control the voltage source to provide the operating voltage having a forward polarity during switching of the optical element from the first optical state to the second optical state during a first switching cycle, and provide the operating voltage having a reverse polarity during switching of the optical state of the optical element from the first optical state to the second optical state during a second switching cycle. For example, during switching of the optical element from the first optical state to the second optical state in the first switching cycle, a positive voltage (such as the elevated voltage or the operating voltage) is applied to a first electrically conductive layer (such as the electrically conductive layer arranged on one side of the active substance) and a zero potential (i.e grounded) is applied to a second electronically conductive layer (such as the electrically conductive layer arranged on an opposite side of the active substance as compared to the first electrically conductive layer). Furthermore, during a next switching cycle of the optical element from the first optical state to the second optical state (subsequent to switching of the optical element back from the second optical state to the first optical state), the polarity of the provided operating voltage is reversed such that the negative voltage is applied to the first electrically conductive layer and the zero (ground) voltage is applied to the second electrically conductive layer. It will be appreciated that the optical element may experience degeneration due to application of the electric field and/or changes in temperature thereof, during prolonged operation of the optical display arrangement. Furthermore, application of voltage having a same polarity during successive switching cycles of the optical element may cause damage to the optical element. However, the application of voltage having the reverse polarity during alternate switching cycles leads to zero average voltage applied across the optical element when consecutive switching cycles are considered. In such an instance, the electric field-induced degeneration of the optical element is balanced during alternate switching cycles and thereby, an operating life of the optical element is extended.

According to one embodiment, the first optical state is an optically transparent state and the second optical state is an optically opaque state; or the first optical state is the optically opaque state and the second optical state is the optically transparent state. For example, when the active substance is a liquid crystal that is implemented as the mixture of low-viscosity liquid crystals and the chiral dopant, the liquid crystal molecules have no alignment when no voltage is applied across the optical element. Furthermore, the lack of alignment of the liquid crystal molecules obstructs transmission of light through the active substance and consequently, through the optical element. Therefore, the first optical state of such an optical element (when no operating voltage is applied across the optical element) is an optically opaque state. The optically opaque state is a state associated with light diffusive properties and little (0.5-7%) direct transmittance of incident light. Furthermore, when voltage is applied across the optical element, the liquid crystal molecules attain a homeotropic alignment, enabling direct transmission of light through the active substance. Therefore, the second optical state of the optical element is an optically transparent state. Moreover, as the applied voltage is removed (or a voltage applied to the optical element is lowered) from the optical element, the liquid crystal molecules will go through one or more transient alignments. For example, upon removal (or lowering the applied voltage below a limit) of the applied voltage, the liquid crystal molecules are operable to attain a transient-planar alignment that is identified by the optical element having a semi-transparent optical state (such that the optical element is associated with transmittance of nearly 50% of incident light therethrough).

Alternatively, the first optical state is the optically transparent state identified by a complete transmittance of incident light through the optical element, for example, resulting due to the liquid crystal molecules having a homeotropic alignment upon application of voltage. In such an instance, the second optical state is the optically opaque state identified by no direct transmittance of incident light through the optical element, for example, resulting from the liquid crystal molecules having no particular alignment when no voltage is applied across the optical element.

In an embodiment, the optical display arrangement further comprises at least one transparency sensor operatively coupled to the optical element and the controller. For example, a transparency sensor is arranged with the optical element to detect a transmittance of incident light through the optical element (such as transmittance of light through the active substance, the various layers and the plurality of electrically insulating spacers). To enable such detection, a transparency sensor may be operatively coupled to a front and a back of the optical element. The transparency sensor is communicatively coupled to the controller, such as, using wired or wireless connection. In one example, the transparency sensor is implemented as at least one of a photoelectric sensor, a laser sensor and so forth.

Furthermore, the at least one transparency sensor is operable to detect an operating transparency of the optical element in the optically transparent state. In one example, the optical element is in the optically opaque state when no voltage is applied therethrough. In such an example, the at least one transparency sensor is operable to detect the level of transmittance of the optical element when the optical display arrangement is in the opaque state (such as, when the optical display arrangement is turned off). On the other hand, the optical element is in the optically transparent state when the operating voltage is applied across the optical element. In such an example, the at least one transparency sensor is operable to detect the transparency of the optical element when the operating voltage is applied to the optical element. However, light that is incident on the optical element may influence the detected optical transparency thereof (such as, incident light from an image projector or ambient light sources), thereby, resulting in inaccurate detection of the optical transparency. To avoid such inaccuracies, the transparency sensor is operable to detect the transparency when no light is projected onto the optical element (such as, during a start-up phase of the optical display arrangement when no light is projected onto the optical element by an image projector).

Moreover, the at least one transparency sensor is operable to determine a relative transparency of the optical element during switching of the optical element from the optically opaque state to the optically transparent state. For example, during switching of the optical element from the optically opaque state to the optically transparent state, the transparency sensor is operable to detect the relative transparency of the optical element, such that the detected relative transparency is a ratio (or percentage value) of an actual transparency and a maximum transparency (such as 96%-97% transparency at 500 nanometer wavelength light) of the optical element. Furthermore, such relative transparency is detected subsequent to application of the first voltage pulse by the voltage source during switching of the optical element from the optically opaque state to the optically transparent state. Alternatively, the relative transparency is detected by the transparency sensor at multiple time-points during switching of the optical element from optically opaque state to the optically transparent state (such as time-points associated with a beginning of a switching cycle, at an intermediate stage during the switching cycle and at an end of the switching cycle). In such an instance, the relative transparency of the optical element is associated with maximum detected transparency of the optical element.

Furthermore, the transparency sensor is operable to provide the detected operating transparency and the determined relative transparency of the optical element to the controller. For example, the transparency sensor is operable to provide the detected operating transparency and the determined relative transparency as a digital signal to the controller. Furthermore, the controller is operable to control the voltage source to apply the first voltage pulse until the determined relative transparency is equal to the detected operating transparency. For example, the transparency sensor is operable to detect the operating transparency of the optical element during a first switching cycle, such as, during a start-up phase of the optical display arrangement or during first switching of the optical element from the first optical state to the second optical state during regular operation of the optical display arrangement. The transparency sensor is operable to detect the relative transparency of the optical element during all subsequent switching cycles, such as, until the operation of the optical display arrangement is terminated (for example, by turning off the optical display arrangement). In such an instance, during the subsequent switching cycles, the controller is operable to apply the first voltage pulse until the determined relative transparency of the optical element (during that switching cycle) is equal to the detected operating transparency of the optical element (detected during the first switching cycle). Subsequently, upon determining by the transparency sensor that the relative transparency of the optical element is equal to the operating transparency thereof, the controller is operable to provide the operating voltage to the optical element. Alternatively, or optionally, the controller is operable to adjust a voltage of the first voltage pulse until the determined relative transparency of the optical element is equal to the operating transparency of the optical element. Further the transparency sensor such as a photodetector can be configured to provide a voltage in respect to the intensity of gathered light, then a comparator can be used with a predetermined (or programmable) threshold reference voltage. When the voltage of the photodetector reaches the threshold, the output state of the comparator changes—consequently this event can be detected by control logic to terminate the first voltage pulse by lowering it with value of elevated voltage to an operating voltage.

According to an embodiment, the controller is further operable to record a period of time associated with application of the first voltage pulse until the determined relative transparency is equal to the detected operating transparency, and update the first period of time to the recorded period of time. For example, the optical element may be subjected to degeneration after prolonged use of the optical display arrangement, such as, due to stresses experienced by application of an electric field across the optical element and/or due to changes in temperature of the optical element during operation of the optical display arrangement. The first period of time associated with application of the first voltage pulse for such an optical element may be required to be adjusted, to overcome undesirable effects of such degeneration thereof. In such an instance, the controller is operable to record the period of time associated with application of the first voltage pulse until the relative transparency is equal to the operating transparency of the optical element. Optionally, the controller is operable to record time values during multiple operations of the optical display arrangement and subsequently, compute an average time value to update the first period of time value to the average time value. Subsequently, when an operation of the optical display arrangement is started again, the controller is operable to update the first period of time based on the recorded time values (for example, wherein the first period of time is associated with application of the pulse of elevated voltage during the first switching cycle of the optical element). Optionally, the controller is operable to make the first period of time equal to the recorded period of time. In this way, the controller is operable to iteratively and automatically modify the period of time for application of the first voltage pulse. According to additional embodiment the optical sensor arrangement can be used during calibration phase of the volumetric display. The calibration refers to finding proper over voltage values and durations to apply the over voltage. The calibration can be also used to determine threshold voltages and related electric field strengths.

According to an embodiment, the optical display arrangement is implemented in a volumetric display device. The volumetric display device enables presentation of 3-dimensional (or 3D) images (and/or videos) and comprises a plurality of optical elements. For example, the plurality of optical elements is implemented as a stack of planar and/or curved optical elements arranged in a sequential way, wherein the stack comprises in a range of 10 to 50 optical elements. As an example, the elements are arranged with equal spacing or alternatively with spacing that changes with the order number. In deed—the spacing can be smaller for elements which are closer to the front of the display and larger between those elements which are near the back of the display. Furthermore, the 3D images are presented as portions (or image slices) on each optical element of the plurality of optical elements. Each optical element of the plurality of optical elements is sequentially (or for example in an interlaced order) switched from the second optical state to the first optical state to enable such presentation of the portion of the 3D image thereon and other optical elements of the plurality of optical elements are maintained in the first optical state (or the second optical state). In such an instance, the controller comprises a high voltage waveform generator that enables the plurality of optical elements to be sequentially switched at a fast switching rate. For example, the optical elements of the volumetric display device are switched such that the volumetric display device is associated with a volumetric refresh rate equal to or more than 25 hertz (that is, each of the optical elements is switched 25 or more times per second during operation of the volumetric display device). It will be appreciated that such presentation of the 3D images on the plurality of optical elements at the fast switching speed enables a user to perceive a 3-dimensional nature (or depth) associated with the 3D images (and/or videos). In one example, the 3D images are projected on the optical elements using an image projector that is associated with a large depth of field. Furthermore, the image projector comprises necessary optics for appropriately focusing the portions of the 3D images onto the plurality of optical elements. In such an instance, operation of the image projector is synchronized with operation of the optical elements (such as switching thereof between different the first and second optical states) to enable the presentation of 3D images to the user. The controller is also operable to control the voltage source to provide the operating voltage to maintain the other optical elements in the first optical state (or the second optical state). In one example, the volumetric display device is implemented in an augmented reality head-up display (AR HUD).

In one embodiment, the optical display arrangement is implemented in a head-mounted display device. For example, the head-mounted display device is a virtual reality (VR) headset comprising at least one near-eye display for displaying 3D images to a user wearing the head-mounted display device. In such an example, the optical display arrangement is implemented as the at least one near-eye display. It will be appreciated that as the optical display arrangement enables presentation of 3D images directly to the eyes of the user, the head-mounted display may not be required to comprise complicated units such as lenses for magnification of images, motor arrangements for moving the near-eye displays, and so forth, for displaying the 3D images to the user. Furthermore, such implementation of the optical display arrangement in the head-mounted display device enables easy and convenient presentation of 3D images to the user, while enabling manufacture of lightweight head-mounted display devices.

In one embodiment, the near-eye display is a volumetric display device. For example, the head-mounted display device comprises at least one volumetric display device for displaying 3D images to the user, the volumetric display device comprising an optical display arrangement as explained in detail hereinabove.

DETAILED DESCRIPTION OF THE DRAWINGS

Referring to FIG. 1A, there is shown a schematic illustration of an optical display arrangement 100, in accordance with an embodiment of the present disclosure. The optical display arrangement comprises an optical element 102. As shown, the optical element 102 comprises an active substance 104 enclosed between two optically transparent dielectric substrates 106A-B. The two optically transparent dielectric substrates 106A-B are each coated with anti-reflective coating 108A-B. Furthermore, the optical element 102 comprises electrically conductive layers 110A-B arranged between each of the optically transparent dielectric substrates 106A-B and the active substance 104. As shown, the optical element 102 comprises electrically insulating layers 112A-B arranged between each of the electrically conductive layers 110A-B and the active substance 104 on each side of the active substance 104. Moreover, the optical element 102 comprises buffer layers 114A-B included between each of the optically transparent dielectric substrates 106A-B and the electrically conductive layers 110A-B. As shown, the optical element 102 comprises liquid crystal alignment layers 116A-B along each side of the active substance 104. Furthermore, a plurality of electrically insulating spacers 118 is arranged in the optical element 102, within the active substance 104. The optical element 102 comprises seals 120A-B that enables to retain the active substance 104 between the optically transparent dielectric substrates 106A-B. The optical display arrangement 100 comprises a voltage source 122 connected to the optical element 102 and a controller 124 operatively coupled to the voltage source 122.

Figure 1B:
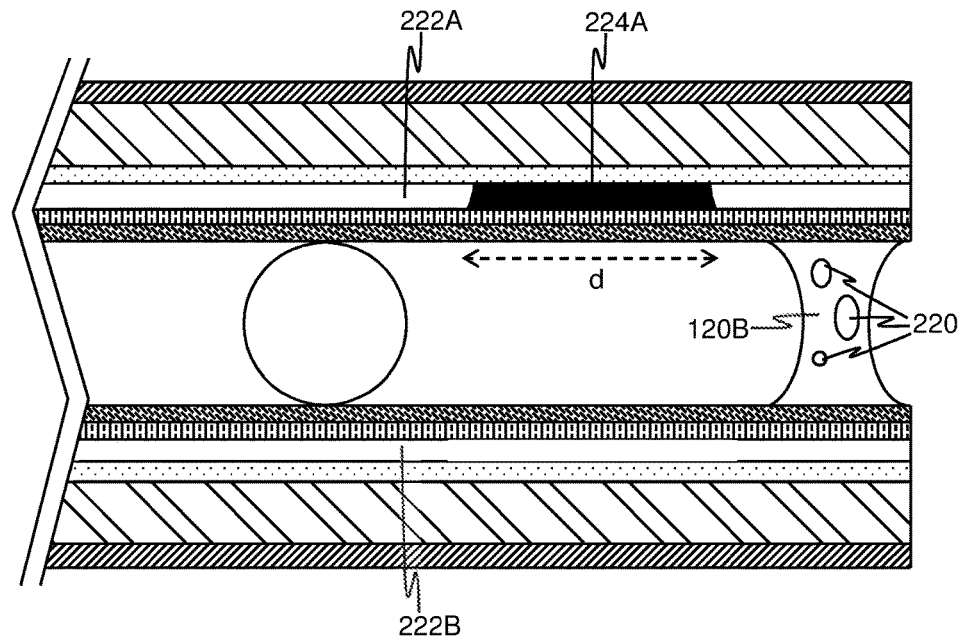

Referring to FIG. 1B, there is shown a schematic illustration of the optical element 102 of FIG. 1A, in accordance with another embodiment of the present disclosure. The seal 120B is shown to comprise air-bubbles 220. Furthermore, each of electrically conductive layers 222A-B comprises isolation gap 224A respectively (gap related to the conductive layer 222A is only shown in a figure, the gap related to the conductive layer 224B is on other edge of the display element), having a width of d. Furthermore, electric field is not applied across such isolation gaps 224A, thereby enabling to prevent dielectric breakdown of the seal 120B due to absence of electric field across the seal 120B.

Figure 2A:
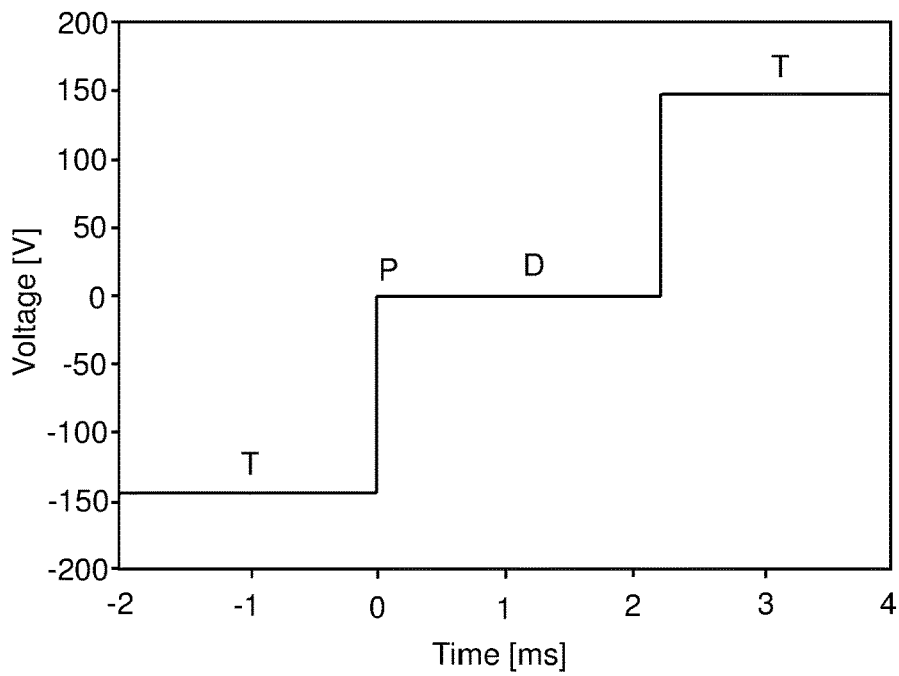
FIG. 2A is a graph illustrating a change in applied voltage with respect to time during switching of an optical element (such as the optical element of FIG. 1A) between a first optical state and a second optical state, in accordance with an embodiment of the present disclosure.

Referring to FIG. 2A, there is shown a graph illustrating a change in applied voltage with respect to time during switching of an optical element (such as the optical element 102 of FIG. 1A) between a first optical state and a second optical state, in accordance with an embodiment of the present disclosure. The vertical (ordinate) axis represents the voltage (in volts) applied to the optical element and the horizontal axis (abscissa) represents a change in time (in milliseconds). As shown, a voltage of approximately −150 volts is applied to the optical element to maintain the optical element in an optically transparent state (T). Subsequently, the applied voltage is removed from the optical element at time period corresponding to 0 ms. As shown (see FIG. 2B), the optical state of the optical element temporarily switches to an optically semi-transparent state (P), before switching to an optically opaque state (D). Furthermore, a voltage of approximately +150 volts is applied to the optical element to switch the optical element from the optically opaque state (D), back again to the optically transparent state (T).

Figure 2B:
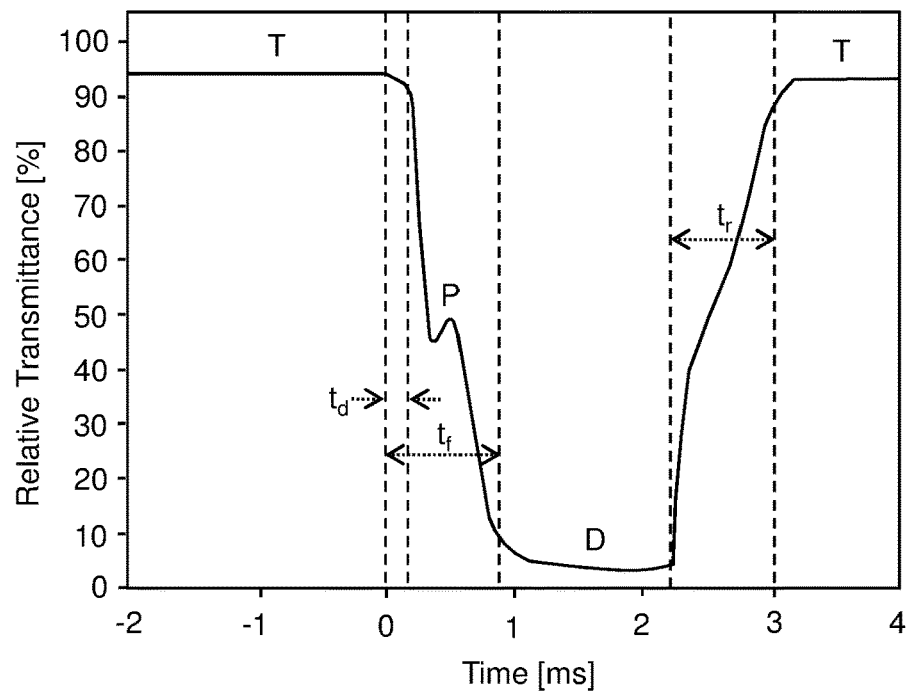
FIG. 2B is a graph corresponding to the graph of FIG. 2A, illustrating a change in relative transmittance with respect to time during switching of the optical element between the first optical state and the second optical state, in accordance with an embodiment of the present disclosure.

Referring to FIG. 2B, there is shown a graph corresponding to the graph of FIG. 2A, illustrating a change in relative transmittance with respect to time during switching of the optical element between the first optical state and the second optical state, in accordance with an embodiment of the present disclosure. As shown, the vertical (ordinate) axis depicts relative transmittance of the optical element, wherein a value of 0% relative transmittance is associated with the optical element being in a completely optically opaque state and a value of 100% relative transmittance is associated with the optical element being in a completely optically transparent state. Furthermore, the horizontal (abscissa) axis depicts time taken by the optical element to switch between the first optical state and the second optical state. The second optical state of the optical element is associated with the optically transparent state (T) when the voltage is applied across the optical element. Furthermore, when the applied voltage is removed from the optical element, the optical element switches from the optically transparent state (T) (the second optical state) to the optically semi-transparent state (P) and subsequently, to the optically opaque state (D) (i.e. to the first optical state), wherein such switching is associated with time a fall time ($t_f$). As shown, the fall time ($t_f$) comprises a delay time ($t_d$) of less than 200 microseconds. Subsequently, upon application of the voltage, the optical element switches from the optically opaque state (D) to the optically transparent state (T) and as shown, such switching is associated with a rise time ($t_r$).

Figure 2C:
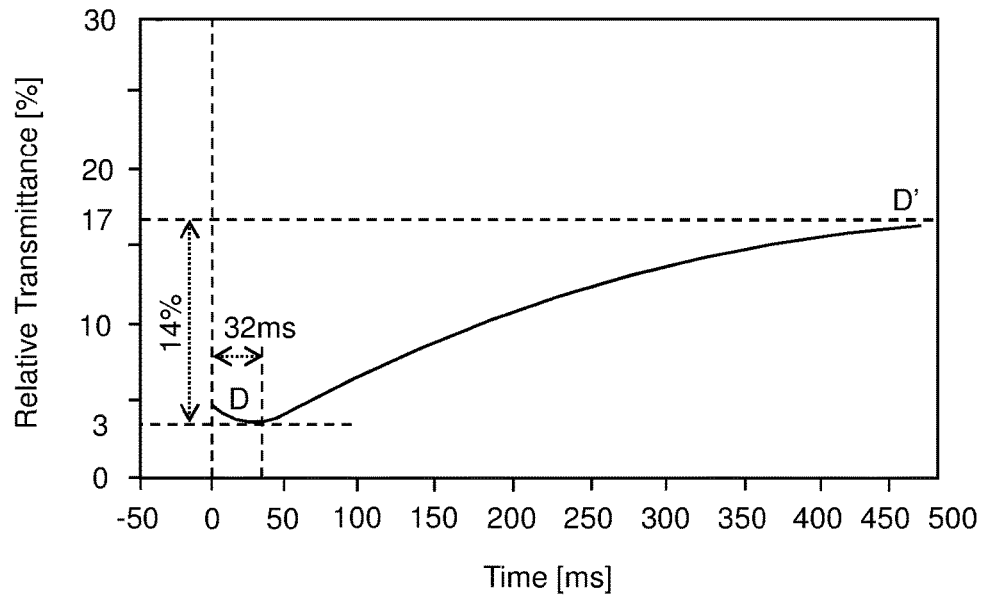
FIG. 2C is a graph corresponding to the graph of FIG. 2B, illustrating a change in relative transmittance with respect to time after switching of the optical element to the second optical state, in accordance with an embodiment of the present disclosure.

Referring to FIG. 2C, there is shown a graph illustrating a change in relative transmittance with respect fo time after switching of the optical element to the first optical state, in accordance with an embodiment of the present disclosure. As shown, the optically opaque state (D) of the optical element is associated with a period of time of 32 milliseconds. Furthermore, when no voltage is applied across the optical element during the optically opaque state (D) thereof, the optical element attains a reduced optically diffusive state (D') after a period of time of around 500 milliseconds. As shown, the reduced optically diffusive state (D') is associated with increased relative transmittance of the optical element, wherein the optical element has relative transmittance of 17%. It is good to note that during the said time of 32 millisecond the display element is best suited for projecting an image in the display since it's opaqueness is in "maximum". Depending on the used active material the time can be different for example 10-20 millisecond or 20-50 millisecond.

Figure 2D:
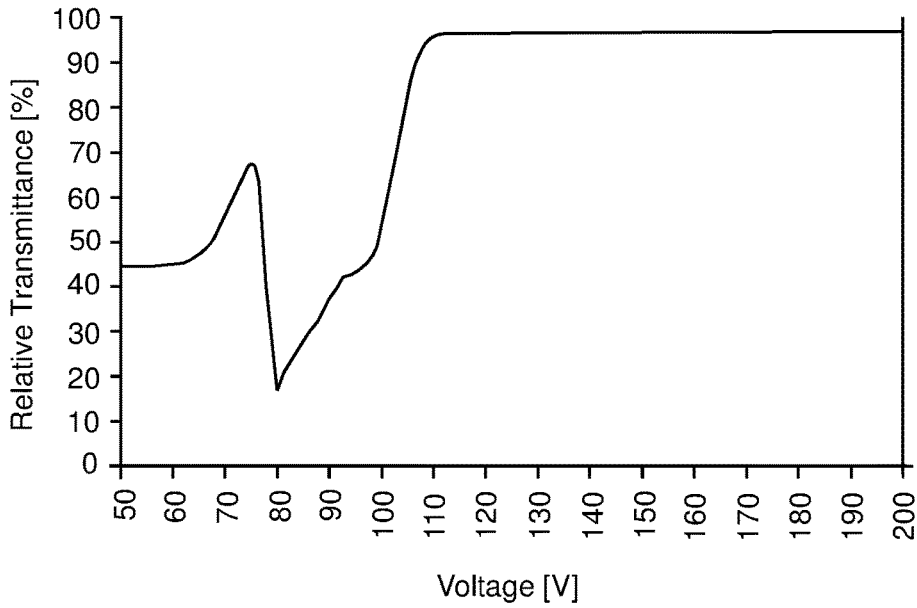
FIG. 2D is a graph illustrating a change in relative transmittance with respect to voltage applied across an optical element (such as the optical element of FIG. 1A), during switching of the optical element between a first optical state and a second optical state, in accordance with an embodiment of the present disclosure.

Referring to FIG. 2D, there is shown a graph illustrating a change in relative transmittance with respect to voltage applied across an optical element (such as the optical element 102 of FIG. 1A), during switching of the optical element between a first optical state and a second optical state, in accordance with an embodiment of the present disclosure. As shown, a relative transmittance in a range of 95 to 100% is attained by the optical element when the applied voltage is more than 110 volts.

Figure 2E:
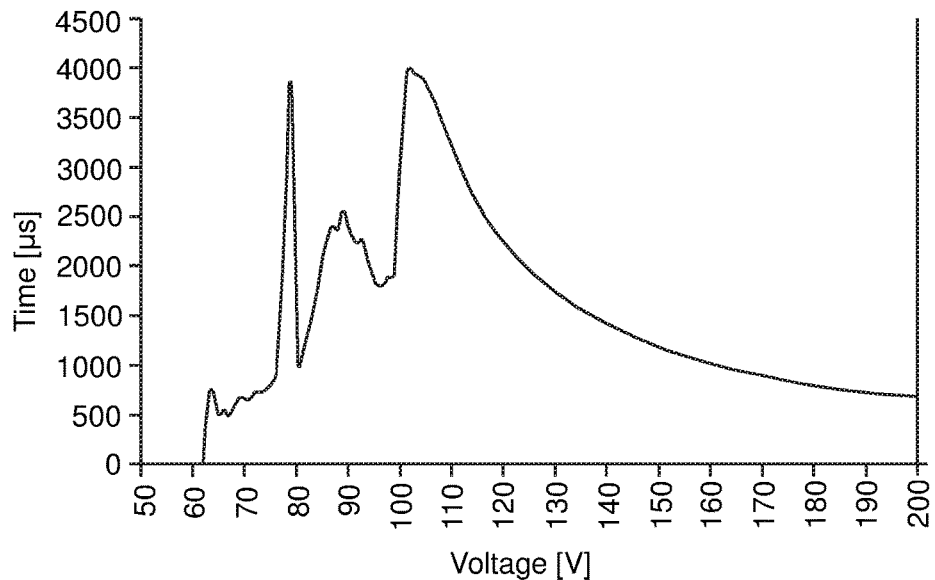
FIG. 2E is a graph corresponding to the graph of FIG. 2D, illustrating a change in rise time with respect to voltage applied across the optical element during switching of the optical element between the first optical state and the second optical state, in accordance with an embodiment of the present disclosure.

Referring to FIG. 2E, illustrates a change in rise time with respect to voltage applied across the optical element during switching of the optical element between the first optical state and the second optical state, in accordance with an embodiment of the present disclosure. As shown, an exponential decrease in the rise time is observed for switching of the optical element between an optically opaque state and the optically transparent state, when the applied voltage is more than 110 volts. Furthermore, when the applied voltage is more than 110 volts, a higher applied voltage enables a higher reduction in the rise time of the optical element. As a note, below threshold voltage of 110 volts the optical element is unpredictable. In the graph of FIG. 2E the data points below 110 voltage shows random times due to nature of the optical element. Above the threshold voltage the element is reliably usable. As another note, the threshold voltage of 110 V corresponds to electric field strength which can be calculated if distance between electrodes is known.

Figure 3A:
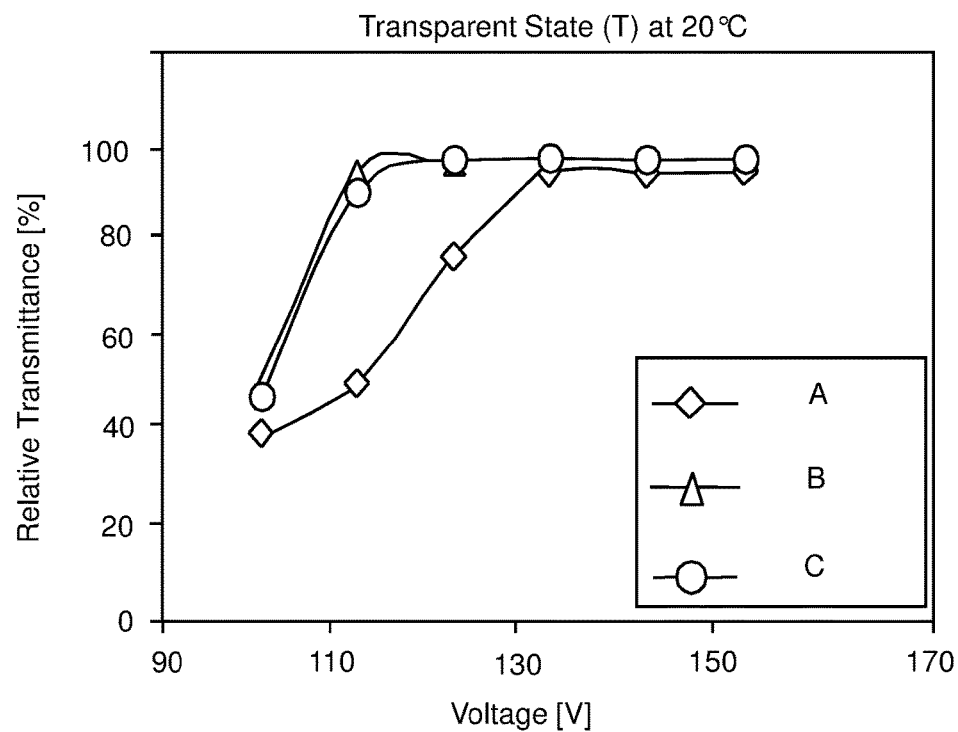
FIG. 3A is a graph illustrating a change in relative transmittance with respect to applied voltage for an optical element (such as the optical element of FIG. 1) in an optically transparent state, at a temperature of 20° C. for different active substances (such as the active substance of FIG. 1), in accordance with an embodiment of the present disclosure.

Referring to FIG. 3A, there is shown a graph illustrating a change in relative transmittance with respect to applied voltage for an optical element (such as the optical element 102 of FIG. 1) in an optically transparent state, at a temperature of 20° C. for different active substances A, B, and C (such as the active substance 104 of FIG. 1), in accordance with an embodiment of the present disclosure. As shown, when the optical element is maintained at an operating temperature of 20° C., all active substances A, B and C attain a relative transmittance (wherein a value of 0% relative transmittance is associated with the optical element being in a completely optically opaque state and a value of 100% relative transmittance is associated with the optical element being in a completely optically transparent state) between 95 to 100% when the applied voltage is more than 130 volts.

Figure 3B:
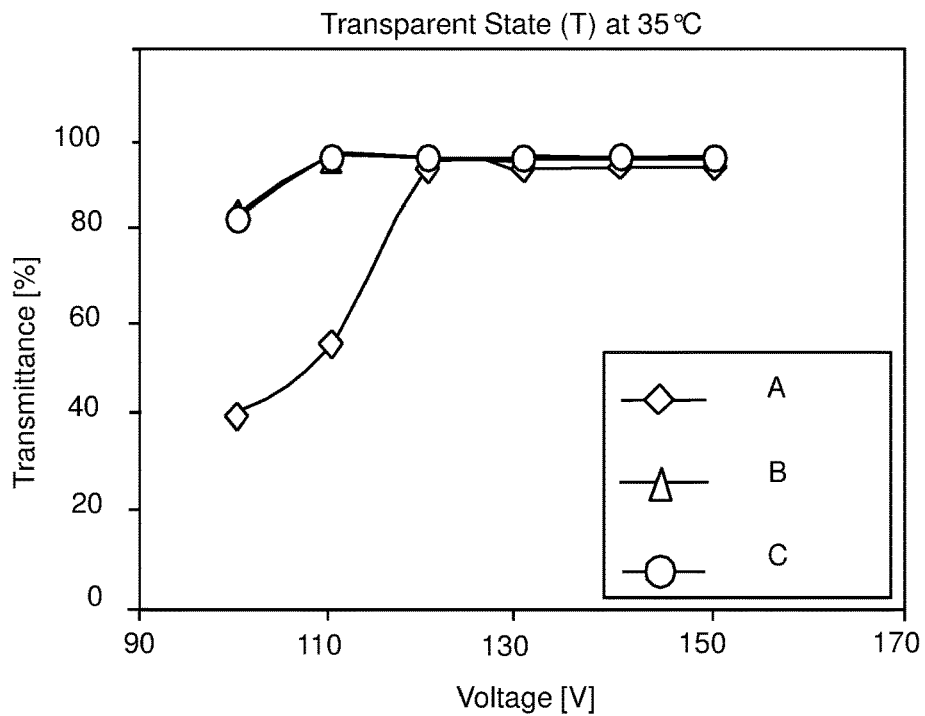
FIG. 3B is a graph corresponding to the graph of FIG. 3A, illustrating a change in relative transmittance with respect to applied voltage for the optical element in the optically transparent state, at a temperature of 35° C. for different active substances, in accordance with an embodiment of the present disclosure.

Referring to FIG. 3B, there is shown a graph corresponding to the graph of FIG. 3A, illustrating a change in relative transmittance with respect to applied voltage for the optical element in the optically transparent state, at a temperature of 35° C. for different active substances, in accordance with an embodiment of the present disclosure. As shown, when the optical element is maintained at an operating temperature of 35° C., all active substances A, B and C attain the relative transmittance between 95 to 100% when the applied voltage is more than 120 volts.

Figure 3C:
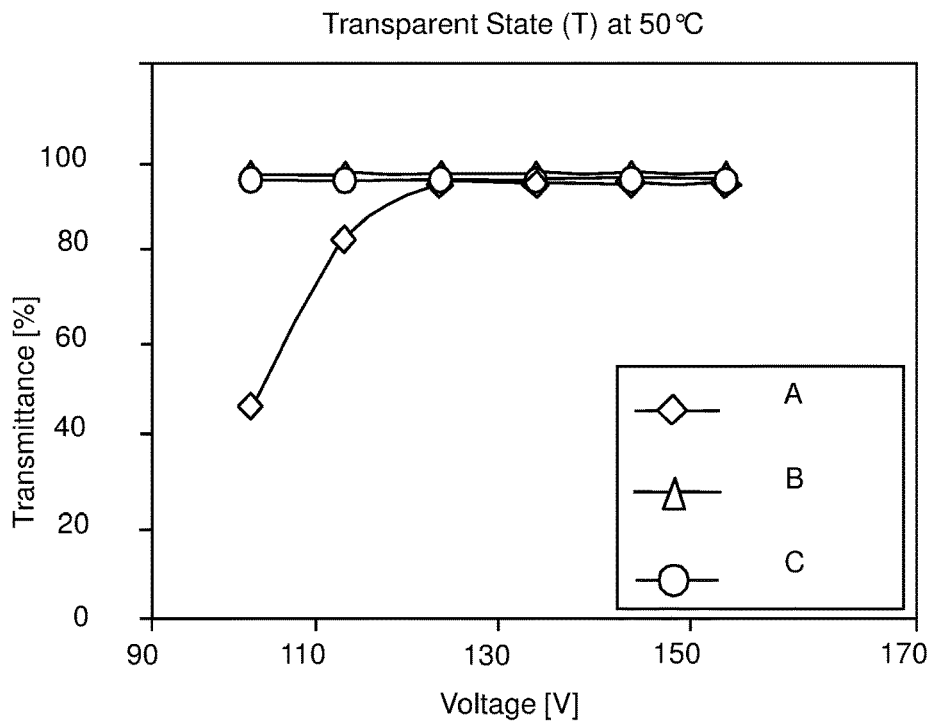
FIG. 3C is a graph corresponding to the graph of FIG. 3B, illustrating a change in relative transmittance with respect to applied voltage for the optical element in the optically transparent state, at a temperature of 50° C. for different active substances, in accordance with an embodiment of the present disclosure.

Referring to FIG. 3C, there is shown a graph corresponding to the graph of FIG. 3B, illustrating a change in relative transmittance with respect to applied voltage for the optical element in the optically transparent state, at a temperature of 50° C. for different active substances, in accordance with an embodiment of the present disclosure. As shown, when the optical element is maintained at an operating temperature of 50° C., all active substances A, B and C attain a relative transmittance between 95 to 100% when the applied voltage is more than 120 volts.

Referring to FIG. 4A, there is shown a table illustrating voltages applied to an optical element (such as the optical element 102 of FIG. 1) for attaining a relative transmittance between 95 to 100%, for different temperatures and different active substances, in accordance with an embodiment of the present disclosure. From the table, it may be observed that the voltage that is required to be applied for the optical element to attain the relative transmittance between 95 to 100% decreases with an increase in the temperature of the optical element.

Referring to FIG. 4B, there is shown a table illustrating a change in relative transmittance with respect to temperature of an optical element (such as the optical element 102 of FIG. 1) in an optically opaque state, when no voltage is applied across the optical element, in accordance with an embodiment of the present disclosure. From the table, it may be observed that the relative transmittance of the optical element in the optically opaque state varies based on the operating temperature of the optical element and the active substance (such as the active substance 104 of FIG. 1) included in the optical element.

Figure 5A:
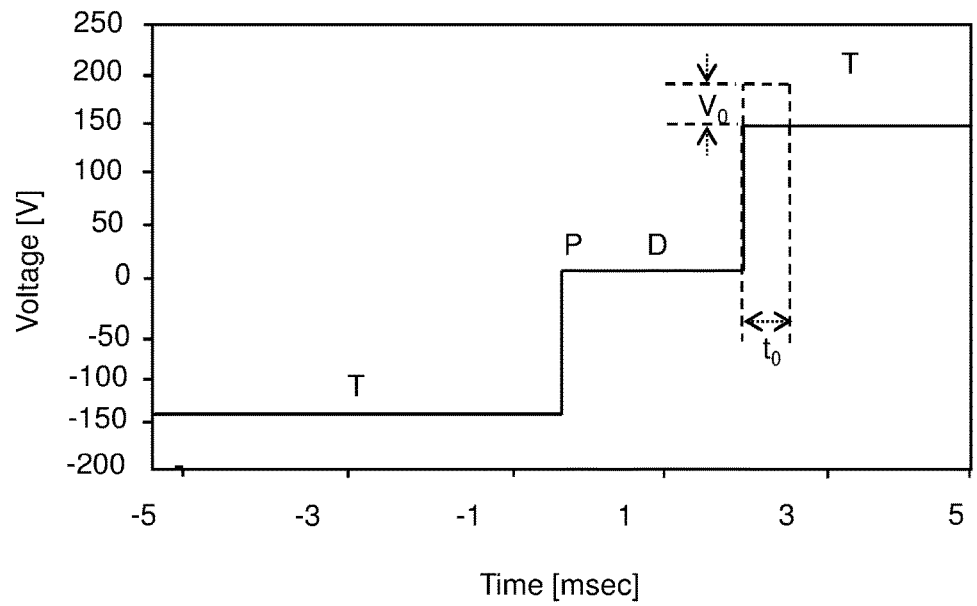
FIG. 5A is a graph illustrating a change in voltage applied with respect to time during switching of an optical element (such as the optical element of FIG. 1A) between a first optical state and a second optical state, in accordance with an embodiment of the present disclosure.

Referring to FIG. 5A, there is shown a graph illustrating a change in voltage applied with respect to time during switching of an optical element (such as the optical element 102 of FIG. 1A) between a first optical state and a second optical state, in accordance with an embodiment of the present disclosure. As shown, a voltage of −150 volts is applied across the optical element to maintain the optical element in an optically transparent state (T). Furthermore, the applied voltage is removed and the optical element switches from the optically transparent state (T) to an optically semi-transparent state (P), followed by an optically opaque state (D). Subsequently, to switch the optical element from the optically opaque state (D) back to the optically transparent state (T), a first voltage pulse (corresponding to sum of a pulse of elevated voltage ($V_0$) of 50 volts and an operating voltage of 150 volts), is applied to the optical element, for a first period of time ($t_0$), to switch the optical element from the optically opaque state (D) to the optically transparent state (T).

Figure 5B:
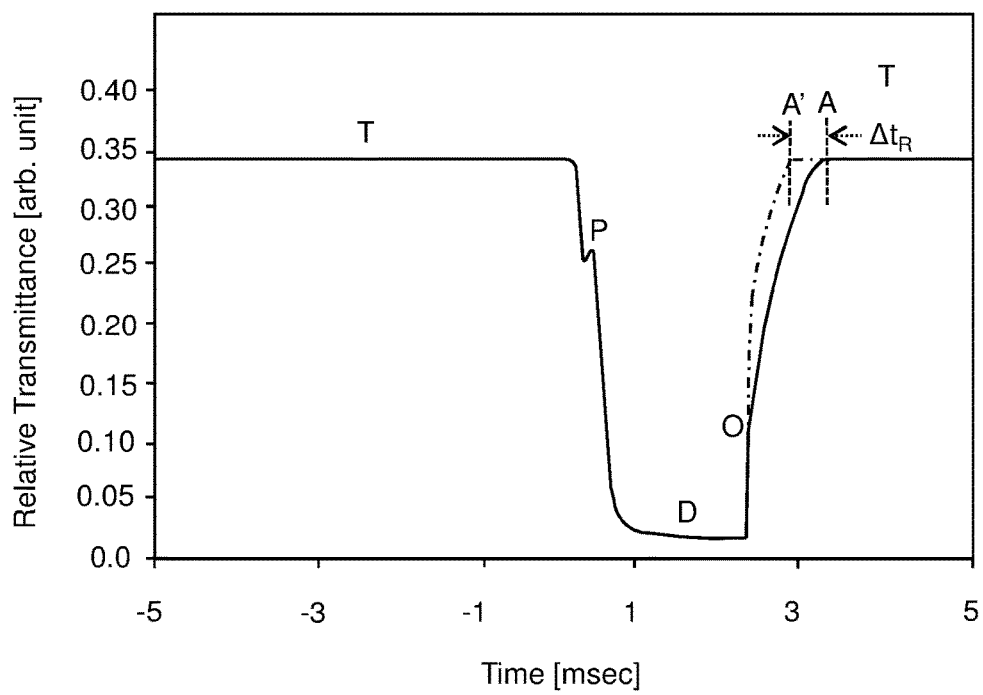
FIG. 5B is a graph corresponding to the graph of FIG. 5A, illustrating a change in relative transmittance with respect to time during switching of the optical element between the first optical state and the second optical state, in accordance with an embodiment of the present disclosure.

Referring to FIG. 5B, there is shown a graph corresponding to the graph of FIG. 5A, illustrating a change in relative transmittance with respect to time during switching of the optical element between the first optical state and the second optical state, in accordance with an embodiment of the present disclosure. The relative transmittance of the optical element changes along a path O-A when the operating voltage is applied to switch the optical element from the optically opaque state (D) to the optically transparent state (T), wherein the path O-A is associated with an original rise time of the optical element. However, when the first voltage pulse is applied to the optical element for the first period of time, relative transmittance of the optical element changes along a path O-A', wherein the path O-A' is associated with a modified rise time of the optical element. As shown, such application of the first voltage pulse to the optical element enables a reduction of $\Delta t_R$ in a rise time associated with the optical element, wherein $\Delta t_R$ is a difference between the modified rise time and the original rise time of the optical element.

Figure 6:
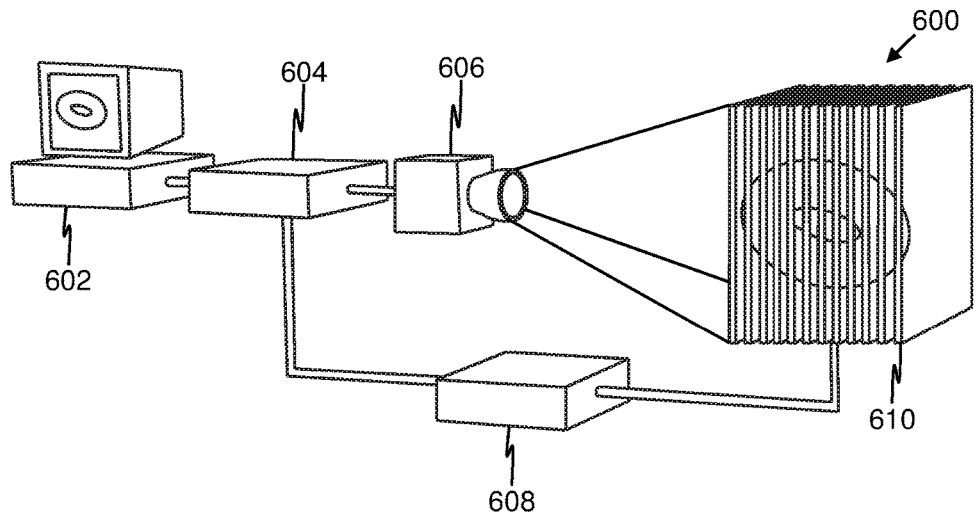
FIG. 6 is a schematic illustration of an exemplary implementation of an optical display arrangement (such as the optical display arrangement of FIG. 1) in a volumetric display device, in accordance with an embodiment of the present disclosure.

Referring to FIG. 6, shown is a schematic illustration of an exemplary implementation of an optical display arrangement (such as the optical display arrangement 100 of FIG. 1) in a volumetric display device 600, in accordance with an embodiment of the present disclosure. The volumetric display device 600 comprises a computer 602 that is operatively coupled to a buffer 604. Furthermore, the buffer 604 is operatively coupled to a projector 606. The optical display arrangement is implemented as optical elements 610 and a driver 608 comprising a voltage source and a controller (not shown). The computer 602 is operable to provide one or more 3-dimensional (3D) images to be displayed on the optical elements 610 to the buffer 604. The buffer 604 operatively coupled to the computer 602 and the projector 606, is operable to temporarily store the provided one or more 3D images, and subsequently provide the one or more 3D images to the projector 606. The projector 606 is operable to project the 3D images on the optical elements 610. As shown, the buffer 604 is also operatively coupled to the driver 608, and is operable to synchronize operation of the driver 608 with an operation of the projector 606. Moreover, the driver 608 is operable to sequentially (or interlaced manner) switch the optical elements 610 between a first optical state and a second optical state, for displaying the one or more 3D images projected thereon by the projector 606.

Figure 7:
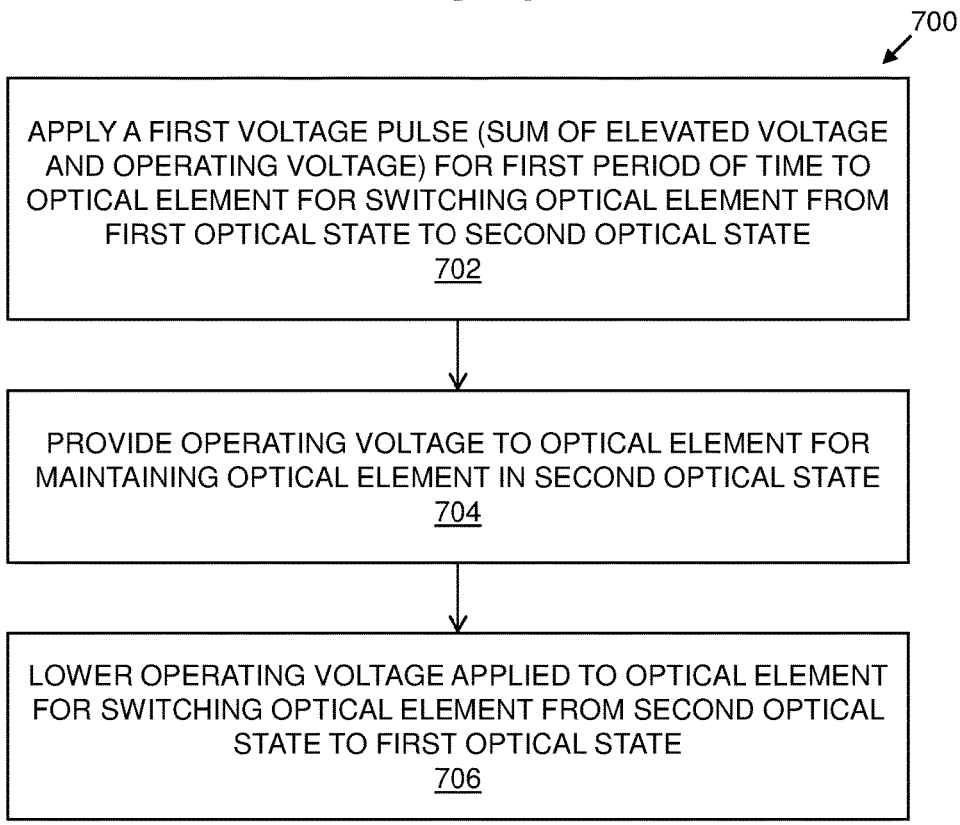
FIG. 7 is an illustration of steps of a method of operating an optical display arrangement, in accordance with an embodiment of the present disclosure.

Referring to FIG. 7, there are shown steps of a method 700 of operating an optical display arrangement, in accordance with an embodiment of the present disclosure. The optical display arrangement comprises an optical element, a voltage source and a controller operable to control the voltage source. At a step 702, a first voltage pulse (sum of elevated voltage and an operating voltage) is applied for a first period of time, to the optical element, for switching the optical element from a first optical state to a second optical state. At a step 704, the operating voltage is provided to the optical element for maintaining the optical element in the second optical state. At a step 706, the operating voltage is removed from the optical element for switching the optical element from the second optical state to the first optical state.

The steps 702 to 706 are only illustrative and other alternatives can also be provided where one or more steps are added, one or more steps are removed, or one or more steps are provided in a different sequence without departing from the scope of the claims herein. In an example, the second optical state is an optically transparent state and the first optical state is an optically opaque state. In another example, the operating voltage is more than a threshold voltage. In yet another example, the threshold voltage corresponds to electric field strength of is at least 10 megavolts per metre (MV/m). As a not 10 MV/m corresponds to 120V over 12-micron gap. In general the thresholds voltage refers to a voltage i.e. electric field strength above which the optical element switches from one state to an other in reliable manner (i.e the transition takes place). In one example, the elevated voltage corresponds to electric field strength of more than 4 megavolts per metre. In another example, the first period of time is in a range of 0.1 to 0.60 milliseconds.

In an example, the method further comprises detecting, using at least one transparency sensor, an operating transparency of the optical element in the optically transparent state; determining a relative transparency of the optical element during switching of the optical element from the optically opaque state to the optically transparent state; and providing the detected operating transparency and the determined relative transparency of the optical element to the controller; wherein the controller is operable to control the voltage source to apply the first voltage pulse until the determined relative transparency is equal to the detected operating transparency. In another example, the method further comprises recording a period of time associated with application of the first voltage pulse until the determined relative transparency is equal to the detected operating transparency; and updating the first period of time to the recorded period of time.

In one example, a sum of the operating voltage and the elevated voltage is less than a breakdown voltage associated with the optical element. In another example, the breakdown voltage corresponds to electric field strength which is equal to or more than 25 megavolts per metre. In yet another example, the optical display arrangement is implemented in a volumetric display device. In yet another example, the optical display arrangement is implemented in a head-mounted display device.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An optical display arrangement comprising:
   an optical element;
   a voltage source connected to the optical element; and
   a controller operatively coupled to the voltage source, wherein the controller is operable to control the voltage source to:
   apply a first voltage pulse, for at least a first period of time, to the optical element, to switch the optical element from a first optical state to a second optical state, wherein a value of the first voltage pulse is at least a sum of an elevated voltage and an operating voltage;
   provide the operating voltage to the optical element to maintain the optical element in the second optical state; and
   lower the operating voltage applied to the optical element to switch the optical element from the second optical state to the first optical state, wherein the first optical state is the optically opaque state and the second optical state is the optically transparent state;
   at least one transparency sensor operatively coupled to the optical element and the controller, wherein the at least one transparency sensor is operable to:
   detect an operating transparency of the optical element in the optically transparent state;
   determine a relative transparency of the optical element during switching of the optical element from the optically opaque state to the optically transparent state; and provide the detected operating transparency and the determined relative transparency of the optical element to the controller;

wherein the controller is further operable to:

control the voltage source to apply the first voltage pulse until the determined relative transparency is equal to the detected operating transparency;

record the period of time associated with application of the first voltage pulse until the determined relative transparency is equal to the detected operating transparency; and update the first period of time to the recorded period of time.

2. An optical display arrangement of claim 1, wherein the operating voltage is more than a threshold voltage.

3. An optical display arrangement of claim 2, wherein the threshold voltage corresponds to an electric field strength of 7.5-10 megavolts per metre.

4. An optical display arrangement of claim 1, wherein the elevated voltage corresponds to an electric field strength of more than 4 megavolts per metre.

5. An optical display arrangement of claim 1, wherein the first period of time is in a range of 0.10 to 0.60 milliseconds.

6. An optical display arrangement of claim 1, wherein the first voltage pulse value is less than a breakdown voltage associated with the optical element.

7. An optical display arrangement of claim 6, wherein the breakdown voltage corresponds to electric filed voltage which is equal to or more than 25 megavolts per metre.

8. An optical display arrangement of claim 1 wherein the optical display arrangement is implemented in a volumetric display device.

9. An optical display arrangement of claim 1, wherein the optical display arrangement is implemented in a head-mounted display device.

10. An optical display arrangement of claim 1, wherein the optical element is a liquid crystal display.

11. A method of operating an optical display arrangement comprising an optical element, a voltage source and a controller operable to control the voltage source, wherein the method comprises:

applying a first voltage pulse for at least a first period of time, to the optical element, for switching the optical element from a first optical state to a second optical state, wherein a value of the first voltage pulse is at least a sum of an elevated voltage and an operating voltage;

providing the operating voltage to the optical element for maintaining the optical element in the second optical state;

lowering the operating voltage applied to the optical element for switching the optical element from the second optical state to the first optical state, wherein the first optical state is an optically transparent state and the second optical state is an optically opaque state; or the first optical state is the optically opaque state and the second optical state is the optically transparent state;

detecting, using at least one transparency sensor, an operating transparency of the optical element in the optically transparent state;

determining a relative transparency of the optical element during switching of the optical element from the optically opaque state to the optically transparent state;

providing the detected operating transparency and the determined relative transparency of the optical element to the controller, wherein the controller is operable to control the voltage source to apply the first voltage pulse until the determined relative transparency is equal to the detected operating transparency;

record the period of time associated with application of the first voltage pulse until the determined relative transparency is equal to the detected operating transparency; and update the first period of time to the recorded period of time.

12. A method of claim 11, wherein the operating voltage is more than a threshold voltage.

13. A method of claim 12, wherein the threshold voltage corresponds to an electric field strength of at least 10 megavolts per metre.

14. A method of claim 11, wherein the elevated voltage corresponds to an electric filed strength of more than 4 megavolts per metre.

15. A method of claim 11, wherein the first period of time is in a range of 0.10 to 0.60 milliseconds.

16. A method of claim 11, wherein the first voltage pulse value is less than a breakdown voltage associated with the optical element.

17. A method of claim 16, wherein the breakdown voltage corresponds to an electric field strength which is equal to or more than 25 megavolts per metre.

18. A method of claim 11, wherein the optical display arrangement is implemented in a volumetric display device.

19. A method of claim 11, wherein the optical display arrangement is implemented in a head-mounted display device.

20. A method of claim 11, wherein the optical element is a liquid crystal display.

* * * * *